United States Patent
Zhang et al.

(10) Patent No.: US 12,458,303 B2
(45) Date of Patent: Nov. 4, 2025

(54) SUPPORT FRAME FOR CT SLIP-RING BEARING

(71) Applicants: NUCTECH COMPANY LIMITED, Beijing (CN); TSINGHUA UNIVERSITY, Beijing (CN)

(72) Inventors: Li Zhang, Beijing (CN); Zhiqiang Chen, Beijing (CN); Mingzhi Hong, Beijing (CN); Qingping Huang, Beijing (CN); Zinan Wang, Beijing (CN); Jinning Liang, Beijing (CN); Hongbin Hou, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 261 days.

(21) Appl. No.: 18/249,959

(22) PCT Filed: Sep. 27, 2021

(86) PCT No.: PCT/CN2021/120992
§ 371 (c)(1),
(2) Date: Apr. 20, 2023

(87) PCT Pub. No.: WO2022/083421
PCT Pub. Date: Apr. 28, 2022

(65) Prior Publication Data
US 2023/0301604 A1    Sep. 28, 2023

(30) Foreign Application Priority Data

Oct. 22, 2020 (CN) .......................... 202011142414.X

(51) Int. Cl.
*A61B 6/00* (2024.01)
*A61B 6/03* (2006.01)
*F16C 35/02* (2006.01)

(52) U.S. Cl.
CPC .............. *A61B 6/035* (2013.01); *F16C 35/02* (2013.01)

(58) Field of Classification Search
CPC ..... A61B 6/035; A61B 6/4441; A61B 6/4488; A61B 6/56
See application file for complete search history.

(56) References Cited

U.S. PATENT DOCUMENTS

| 2002/0031201 A1 | 3/2002 | Suzuki et al. |
| 2010/0025591 A1* | 2/2010 | Luecke .................. A61B 6/035 250/363.05 |

(Continued)

FOREIGN PATENT DOCUMENTS

| CN | 105805172 A | 7/2016 |
| CN | 205643200 U | 10/2016 |

(Continued)

OTHER PUBLICATIONS

Australian Examination Report received in Australian Application No. 2021365222 as mailed Apr. 3, 2024 in 3 pages.

(Continued)

*Primary Examiner* — Dani Fox
(74) *Attorney, Agent, or Firm* — Knobbe, Martens, Olson & Bear, LLP

(57) ABSTRACT

Disclosed is a support frame of a CT imaging system, including: a connection flat plate portion; a support body portion disposed on the connection flat plate portion; an X-ray source installation reference portion disposed on the connection flat plate portion; an electrical installation portion; a cooling component installation portion; and a through hole, wherein the through hole is surrounded by the support body portion, the X-ray source installation reference portion, the electrical installation portion and the cooling component installation portion, and the through hole penetrates the connection flat plate portion. The connection flat plate (Continued)

portion, the support body portion, the X-ray source installation reference portion, the electrical installation portion and the cooling component installation portion are integrally formed.

11 Claims, 3 Drawing Sheets

(56) References Cited

U.S. PATENT DOCUMENTS

| | | |
|---|---|---|
| 2018/0110481 A1 | 4/2018 | Yu |
| 2019/0282185 A1 | 9/2019 | Gregerson et al. |
| 2020/0178911 A1 | 6/2020 | Mani et al. |

FOREIGN PATENT DOCUMENTS

| | | |
|---|---|---|
| CN | 107550512 A | 1/2018 |
| CN | 107981880 A | 5/2018 |
| CN | 109803587 A | 5/2019 |
| CN | 109820532 A | 5/2019 |
| CN | 110301930 A | 10/2019 |
| DE | 102013221726 A1 | 4/2015 |
| JP | 2013-043056 | 3/2013 |
| JP | 2015-137657 | 7/2015 |

OTHER PUBLICATIONS

Extended European Search Report received in European Application No. 21881839.1 as mailed Feb. 6, 2024 in 10 pages.
Chinese Office Action mailed Aug. 3, 2022, Chinese Patent Application No. 202011142414.X, with English translation, 16 pages.
Chinese Office Action mailed Jan. 20, 2023, Chinese Patent Application No. 202011142414.X, 5 pages.
International Search Report and Written Opinion mailed Dec. 29, 2021 in International Application No. PCT/CN2021/120992, 9 pages.

* cited by examiner

SUPPORT FRAME FOR CT SLIP-RING BEARING

CROSS REFERENCE TO RELATED APPLICATION

This application is a Section 371 National Stage Application of International Application No. PCT/CN2021/120992, filed on Sep. 27, 2021, which claims priority to Chinese Patent Application No. 202011142414.X filed on Oct. 22, 2020, the content of which is incorporated herein in its entirety by reference.

TECHNICAL FIELD

The present disclosure relates to the field of radiation detection technology, and more specifically, to a support frame for a CT slip ring bearing.

BACKGROUND

At present, in an existing X-ray CT inspection device, an X-ray source and a detector are mounted on a support frame of a CT imaging system, and the support frame of the CT imaging system is mounted on a support frame by a slip ring bearing and is rotatable around its central axis, so as to realize a tomography scanning. The support frame of the CT imaging system ensures a mounting position of the X-ray source, a mounting position of the detector, and an position accuracy between the X-ray source and the detector, and is an important structural component in a CT device.

The support frame of the CT imaging system is a frame used to support an optical machine, a collimator, a detector and other auxiliary devices for CT imaging. The support frame of the CT imaging system is connected to a bearing on a CT bracket by using a screw, and rotates with the bearing. An appearance of the support frame of the CT imaging system has a fan shape, an upper piece and a lower piece are combined as a whole by a screw, and the support frame of the CT imaging system is connected to the bearing on the CT bracket by using a disk as an intermediate part. The support frame of the CT imaging system is generally made of a cast aluminum material.

As a requirement for a pass rate of object inspection increases continuously, a rotating speed of a rotor is accelerated accordingly. As a volume of a detected object increases, a weight of the support frame of the CT imaging system increases as well. Since a rotating frame is installed with an X-ray source, a detector module and other electronic apparatuses, and these apparatuses have certain weights and are unevenly distributed, so that a high speed rotation and frequent start-stop of the rotor inevitably cause a vibration of the apparatuses. Such vibration not only affects a quality of imaging, but may also be transmitted to a rack, causing an adverse effect on an overall stability of the apparatus. It is required that structural components including the slip ring bearing support frame have a higher rigidity and strength.

At present, the support frame of the existing CT imaging system in the existing technologies is still mainly a structure of a fan-shaped box, which is combined by the upper piece and the lower piece. A ring-shaped connecting part is further needed as a connector when connecting with the bearing on the CT support frame. Due to a split fan-shaped box structure, a single piece structure has a poor rigidity and is easily deformed, and processing thereof is difficult. On the other hand, for the sake of improving a mobility and reducing a workload of mounting and adjustment, reducing weights of structural components such as the support frame of the CT imaging system has become an important demand in this field. Therefore, how to ensure that the support frame of the CT imaging system has a high strength and rigidity while reducing the weight is a major technical problem to be solved.

The background description provided herein is for the purpose of generally presenting the background of the present disclosure. Works of the presently named inventors, to the extent it is described in the background section, as well as aspects of the description that may not constitute the prior art at the time of filing, are neither expressly nor impliedly admitted as prior art against the present disclosure.

SUMMARY

Improvements in the prior art are substantially strengthening methods and corresponding structures of the support frame of the CT imaging system. Therefore, it is desired to propose a support frame of the CT imaging system, of which both a main structure and an assembly process are improved at the same time, so as to solve deficiencies of the above-mentioned prior art.

The present disclosure provides a support frame of a CT imaging system, including: a connection flat plate portion; a support body portion, wherein the support body is disposed on the connection flat plate portion; an X-ray source installation reference portion disposed on the connection flat plate portion; an electrical installation portion; a cooling component installation portion; and a through hole, wherein the through hole is surrounded by the support body portion, the X-ray source installation reference portion, the electrical installation portion and the cooling component installation portion, and the through hole penetrates the connection body portion, wherein the connection flat plate portion, the support body portion, the X-ray source installation reference portion, the electrical installation portion and the cooling component installation portion are integrally formed.

In an embodiment of the present disclosure, the X-ray source installation reference portion, the electrical installation portion and the cooling component installation portion are disposed perpendicular to the connection flat plate portion, and the connection flat plate portion, the support body portion, the X-ray source installation reference portion, the electrical installation portion and the cooling component installation portion are an integrally cast part.

In an embodiment of the present disclosure, a circumferential surface of the support body portion is provided with an integrally formed detector installation portion, and the detector installation portion has a strip shape.

In an embodiment of the present disclosure, a surface of the X-ray source installation reference portion, a surface of the electrical installation portion and a surface of the cooling component installation portion are flat planes, and a surface of the detector installation portion is a curved plane.

In an embodiment of the present disclosure, an end portion of the support body portion opposite to the connection flat plate portion is provided with at least one heat dissipation groove.

In an embodiment of the present disclosure, the surface of the electrical installation portion and the surface of the cooling component installation portion are provided with at least one reinforced rib perpendicular to the connection flat plate portion.

In an embodiment of the present disclosure, an end portion of the support body portion opposite to the connection flat plate portion is provided with a shield portion along a circumference of the through hole.

In an embodiment of the present disclosure, the connection flat plate portion is provided with a plurality of connection holes.

In an embodiment of the present disclosure, an orthographic projection of the support body portion has an arc shape.

In an embodiment of the present disclosure, the electrical installation portion and the cooling component installation portion are disposed at a certain angle with respect to the X-ray source installation reference portion.

In an embodiment of the present disclosure, the connection flat plate has a round board-shaped structure.

In an embodiment of the present disclosure, the support body is disposed perpendicularly on the connection flat plate portion.

In an embodiment of the present disclosure, the through hole is surrounded in the middle of the support frame by the connection flat plate portion, the support body portion, the X-ray source installation reference portion, the electrical installation portion and the cooling component installation portion.

In an embodiment of the present disclosure, the X-ray source installation reference portion is opposite to the support body portion, and the X-ray source installation reference portion is located between the electrical installation portion and the cooling component installation portion.

The structural form of the support frame of the CT imaging system of the present disclosure changes the original manufacturing method of combining multiple components into a method of directly manufacturing one component, so as to improve the rigidity of the component, ensure the mounting position of the X-ray source and the detector and the position accuracy between them, reduce the weight of the rotating part and the assembly workload of workers, and reduce the cost. Among them, the weight is reduced by 30 Kg, and the processing period is reduced by 30%.

Through the following description of preferred embodiments with reference to the accompanying drawings and description thereof, these and other aspects of the present disclosure will become apparent. However, changes and modifications may be made without departing from the spirit and scope of the novel concept of the present disclosure.

BRIEF DESCRIPTION OF THE DRAWINGS

The present disclosure will be more fully understood from the detailed description and the accompanying drawings. The drawings illustrate one or more embodiments of the present disclosure and, together with the written description, serve to explain principles of the present disclosure. When possible, the same reference numerals are used in all drawings to refer to the same or similar elements of the embodiments, in which.

DETAILED DESCRIPTION OF EMBODIMENTS

Figure 1:
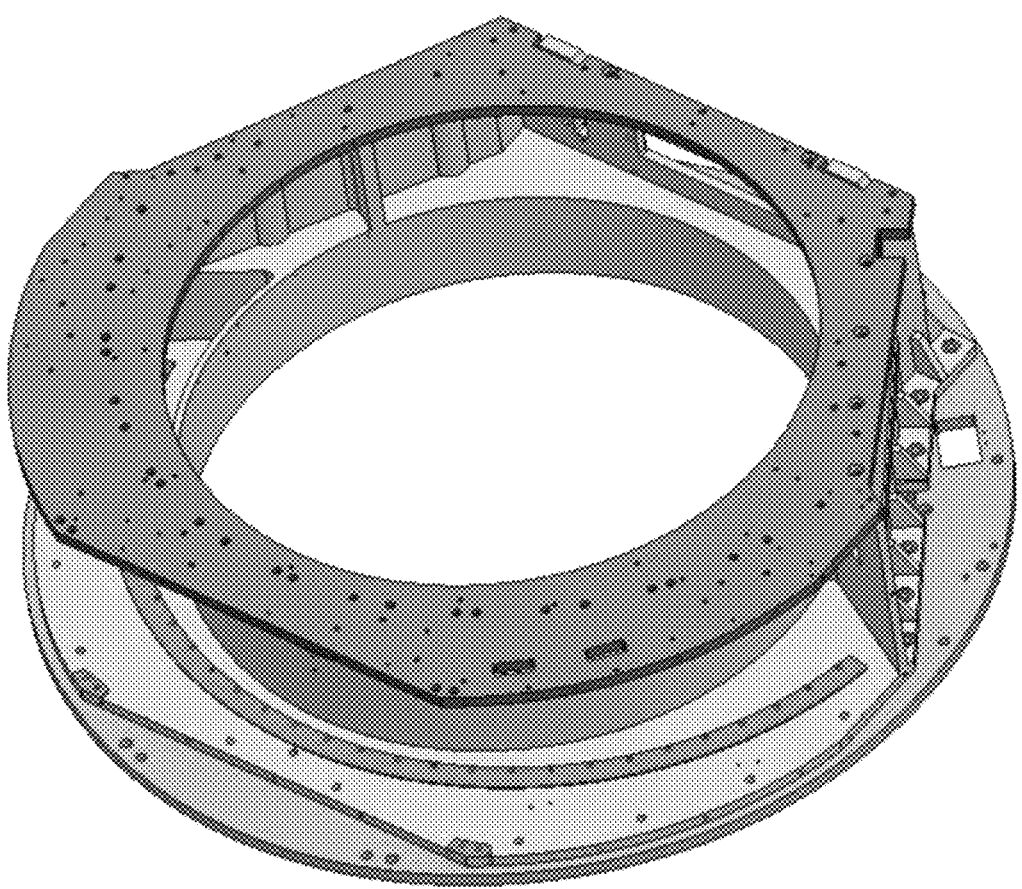
FIG. 1 is a perspective view of a support frame of a CT imaging system in the prior art.

Hereinafter, the present disclosure will be described more fully with reference to the accompanying drawings, in which exemplary embodiments of the disclosure are shown. However, the present disclosure may be embodied in different embodiments and should not be explained as being limited to the embodiments described herein. These embodiments of the present disclosure are provided to make the present disclosure thorough and complete, and fully convey the scope of the present disclosure to those skilled in the art. In the drawings, thicknesses and regions of layers may be exaggerated for clarity. In an overall specification, the same reference numerals are used to indicate the same elements. For different embodiments, elements may have different relationships and different positions.

The support frame of the CT imaging system with a traditional structure is a component having a three thin piece structure, as shown in FIG. 1, an advantage of such structure is easy to process. Disadvantages of such structure are that a structure rigidity is not good, an accuracy is not easy to maintain, there are many connection links, a space occupied is large, a processing workload is large and a weight is heavy, etc. It may be seen from the structure of the traditional support frame that materials at several connecting positions are repeated. By combining three components as a whole, the processing work at the connecting position is directly reduced. The materials in the repeated regions of the connecting parts are eliminated, which reduces the weight and a spatial volume. The reducing of the weight may directly reduce a power consumption of an overall machine.

Figure 2:
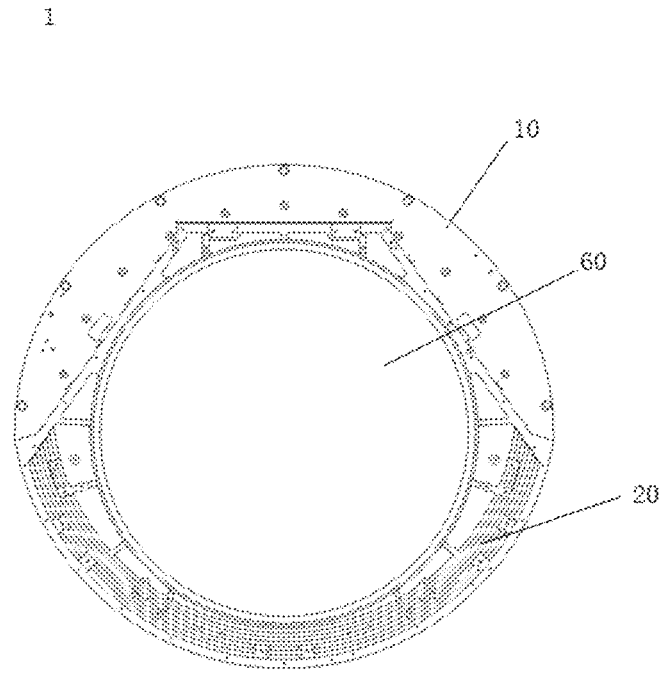
FIG. 2 is a top view of a support frame of a CT imaging system according to an exemplary embodiment of the present disclosure.
Figure 3:
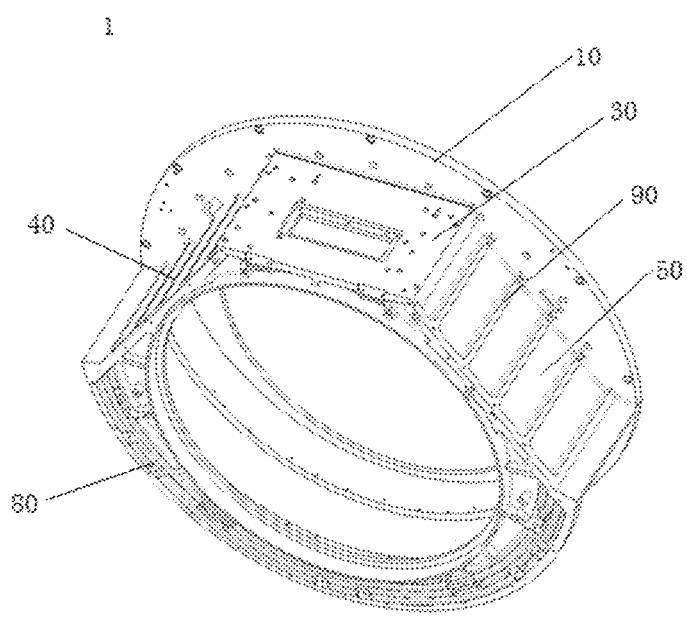
FIG. 3 is a perspective view of a support frame of a CT imaging system according to an exemplary embodiment of the present disclosure.
Figure 4:
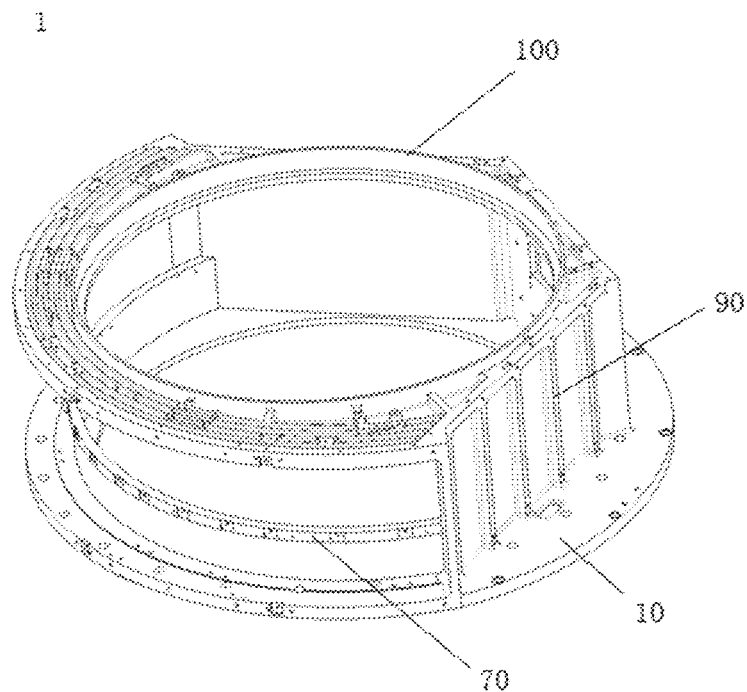
FIG. 4 is another perspective view of the support frame of the CT imaging system according to the exemplary embodiment of the present disclosure.
Figure 5:
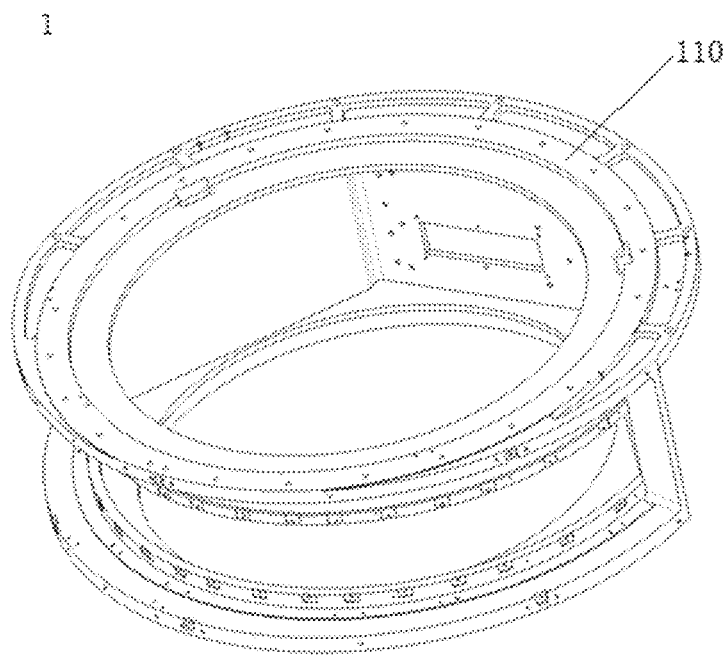
FIG. 5 is yet another perspective view of the support frame of the CT imaging system according to the exemplary embodiment of the present disclosure.

In view of this, the present disclosure proposes a support frame 1 for a CT imaging system. FIG. 2 is a top view of a support frame of a CT imaging system according to an exemplary embodiment of the present disclosure. FIG. 3 is a perspective view of a support frame of a CT imaging system according to an exemplary embodiment of the present disclosure. FIG. 4 is another perspective view of the support frame of the CT imaging system according to the exemplary embodiment of the present disclosure. FIG. 5 is yet another perspective view of the support frame of the CT imaging system according to the exemplary embodiment of the present disclosure.

As shown in FIGS. 2 to 5, the support frame 1 includes: a connection flat plate portion 10; a support body portion 20, the support body is disposed on the connection flat plate portion 10; an X-ray source installation reference portion 30 disposed on the connection flat plate portion 10; an electrical installation portion 40; a cooling component installation portion 50; and a through hole 60, the through hole 60 is surrounded by the support body portion 20, the X-ray source installation reference portion 30, the electrical installation portion 40 and the cooling component installation portion 50, and penetrates the connection flat plate portion 10. The connection flat plate portion 10, the support body portion 20, the X-ray source installation reference portion 30, the electrical installation portion 40 and the cooling component installation portion 50 are integrally formed.

The connection flat plate portion 10 mentioned above is connected to a slip ring bearing (not shown), so that the support frame 1 of an entire imaging system and an inner ring of the slip ring bearing are connected as a whole, so as to drive the entire support frame 1 to rotate. The through hole 60 is disposed in the middle of the support frame 1, and is a space through which a detection device channel passes. The support frame 1 of the imaging system is generally in a substantially arc shape when viewed from top to bottom. The X-ray source installation reference portion 30 is located at a circle center of a fan shape, and a collimator and a detector of an imaging component are mounted on a circumferential surface of the fan shape.

In an embodiment of the present disclosure, the connection flat plate has a round board-shaped structure. The support body is disposed perpendicularly on the connection flat plate portion.

In an embodiment of the present disclosure, the X-ray source installation reference portion 30, the electrical installation portion 40 and the cooling component installation portion 50 are disposed perpendicular to the connection flat plate portion 10, and the connection flat plate portion 10, the support body portion 20, the X-ray source installation reference portion 30, the electrical installation portion 40 and the cooling component installation portion 50 are an integrally cast part, such as a cast iron part, an cast aluminum part and the like.

Through the present disclosure, the connection flat plate portion 10, the support body portion 20, the X-ray source installation reference portion 30, the electrical installation portion 40 and the cooling component installation portion 50 are integrated as an entire cast part, and the through hole 60 is surrounded by the casted integrated part. By integrating the support parts as a whole, the rigidity and the accuracy of the components are improved, the weight of the rotating part is reduced, the assembly workload of workers is reduced, and a cost is reduced. Among them, the weight is reduced by 30 Kg, and a processing period is reduced by 30%.

In an embodiment of the present disclosure, the through hole is surrounded in the middle of the support frame by the connection flat plate portion, the support body portion, the X-ray source installation reference portion, the electrical installation portion and the cooling component installation portion. Moreover, the X-ray source installation reference portion is opposite to the support body portion, and the X-ray source installation reference portion is located between the electrical installation portion and the cooling component.

In an embodiment of the present disclosure, a circumferential surface of the support body portion 20 is provided with a detector installation portion 70 for, for example, mounting the collimator and the detector. The detector installation portion 70 has a strip shape and has a certain thickness. For example, it may be an arc-shaped bar located in the center of the circumferential surface of the support body portion. By integrally casting the detector installation portion 70 on the circumferential surface of the support body portion 20, a processing difficulty may be simplified while a mounting of internal components may be ensured. In other embodiments, the detector installation portion 70 may also be manufactured separately, and then be mounted to the support frame 1 by a process such as welding and the like.

In an embodiment of the present disclosure, surfaces of the X-ray source installation reference portion 30, the electrical installation portion 40 and the cooling component installation portion 50 are substantially flat planes, and a surface of the detector installation portion 70 is a curved plane so as to match with the support body portion 20. In other embodiments, the X-ray source installation reference portion 30, the electrical installation portion 40 and the cooling component installation portion 50 may have any suitable shapes, which is not limited in the present disclosure.

In an embodiment of the present disclosure, an end portion of the support body portion 20 is provided with a heat dissipation groove 80, and the end portion is opposite to the connection flat plate portion 10. The number of heat dissipation grooves 80 is not limited in the present disclosure. As shown in the drawing, the heat dissipation groove 80 includes a plurality of arc-shaped grooves.

In an embodiment of the present disclosure, one or more reinforced ribs 90 are provided on surfaces of the electrical installation portion 40 and the cooling component installation portion 50, and the reinforced ribs 90 are arranged along a direction perpendicular to the connection flat plate portion 10. That is, the reinforced ribs 90 extend perpendicularly from the connection flat plate portion 10. The present disclosure does not limit the specific structure of the reinforced ribs 90. Since the reinforced ribs 90 are molded on the surfaces of the electrical installation portion 40 and the cooling component installation portion 50, the accuracy of the support parts are greatly improved.

In an embodiment of the present disclosure, an end portion of the support body portion 20 opposite to the connection flat plate portion 10 is provided with a shield portion 100 along the circumference of the through hole 60. In other words, the shield portion 100 and the heat dissipation groove 80 are located at the same end of the support body portion 20. The shield portion 100 is closer to the through hole 60 than the heat dissipation groove 80, and protrudes to a certain height from the end portion of the support body portion 20 along an axial direction of the through hole 60, so as to better prevent a leakage of rays.

In an embodiment of the present disclosure, a plurality of connection holes 110 are provided on the connection flat plate portion 10, so as to connect the support frame 1 to the slip ring bearing.

In an embodiment of the present disclosure, an orthographic projection of the support body portion 20 on the connection flat plate portion 10 has an arc shape, preferably a semicircular shape. As shown in the drawing, two ends of the support body portion 20 are connected to the electrical installation portion 40 and the cooling component installation portion 50 seen from the top view of the support frame 1. In other words, the flat planes of the electrical installation portion 40 and the cooling component installation portion 50 are tangentially connected to the two ends of the support body portion 20. The electrical installation portion 40 and the cooling component installation portion 50 are disposed at a certain angle with respect to the X-ray source installation reference portion 30. In other words, both the surface of the electrical installation portion 40 and the surface of the cooling component installation portion 50 are at a certain angle with respect to the surface of the X-ray source installation reference portion 30.

The terms used here are only for the exemplary purpose of the present disclosure, and should not be interpreted as limiting the meaning or scope of the present disclosure. As used in the specification, a singular form may include a plural form unless a specific example is clearly indicated in the context. Moreover, the expressions "including" and/or "comprising" used in this specification neither limit the mentioned shape, number, step, action, operation, member, component and/or group thereof, nor exclude the occurrence or addition of one or more other different shapes, numbers, steps, operations, members, components, and/or groups thereof, or the addition thereof. For ease of description, spatially related terms, such as "on", "above", "upper", "under", "beneath", "below", "lower", etc. are used here to describe the relationship between one element or feature and another element (component) or feature (characteristic) as shown in the drawings. It should be understood that, the spatially related terms are intended to include different orientations of the device (such as a package) in use or operation in addition to the orientation illustrated in the drawings. For example, if the device in the drawings is turned over, an element described as below, beneath or under another element or feature would then be oriented on or above the another element or feature. Thus, the exemplary term "above" may include both an orientation of "above" and an orientation of "below".

The above description of exemplary embodiments of the present disclosure has only been presented for purposes of illustration and description, and is not intended to be exhaustive or to limit the present disclosure to the precise forms disclosed. Many modifications and variations are possible according to the above teaching. The embodiments are chosen and described in order to explain the principles and practical applications of the present disclosure, so as to enable others skilled in the art to utilize the present disclosure and the various embodiments, and may make various modifications suitable for the specific purpose envisioned. Alternative embodiments will become apparent to those skilled in the art without departing from the spirit and scope of the present disclosure. Accordingly, the scope of the present disclosure is defined by the appended claims, rather than by the foregoing description and the exemplary embodiments described therein.

The invention claimed is:

1. A support frame of a CT imaging system, comprising:
   a connection flat plate portion;
   a support body portion disposed on the connection flat plate portion;
   an X-ray source installation reference portion disposed on the connection flat plate portion;
   an electrical installation portion;
   a cooling component installation portion; and
   a through hole, wherein the through hole is surrounded by the support body portion, the X-ray source installation reference portion, the electrical installation portion and the cooling component installation portion, and the through hole penetrates the connection flat plate portion,
   wherein two ends of the support body portion are connected to the electrical installation portion and the cooling component installation portion respectively, the X-ray source installation reference portion is opposite to the support body portion, and the X-ray source installation reference portion is located between the electrical installation portion and the cooling component installation portion,
   wherein a circumferential surface of the support body portion is provided with an integrally formed detector installation portion, and the detector installation portion has a strip shape,
   wherein the connection flat plate portion, the support body portion, the X-ray source installation reference portion, the electrical installation portion, the cooling component installation portion and the detector installation portion are an integrally cast part, and
   wherein an end portion of the support body portion opposite to the connection flat plate portion is provided with at least one heat dissipation groove.

2. The support frame of claim 1, wherein the X-ray source installation reference portion, the electrical installation portion and the cooling component installation portion are disposed perpendicular to the connection flat plate portion.

3. The support frame of claim 1, wherein a surface of the X-ray source installation reference portion, a surface of the electrical installation portion and a surface of the cooling component installation portion are flat planes, and a surface of the detector installation portion is a curved plane.

4. The support frame of claim 1, wherein a surface of the electrical installation portion and a surface of the cooling component installation portion are provided with at least one reinforced rib perpendicular to the connection flat plate portion.

5. The support frame of claim 1, wherein an end portion of the support body portion opposite to the connection flat plate portion is provided with a shield portion along a circumference of the through hole.

6. The support frame of claim 1, wherein the connection flat plate portion is provided with a plurality of connection holes.

7. The support frame of claim 1, wherein an orthographic projection of the support body portion has an arc shape.

8. The support frame of claim 1, wherein the electrical installation portion and the cooling component installation portion are disposed at a certain angle with respect to the X-ray source installation reference portion.

9. The support frame of claim 1, wherein the connection flat plate has a round board-shaped structure.

10. The support frame of claim 1, wherein the support body portion is disposed perpendicularly on the connection flat plate portion.

11. The support frame of claim 1, wherein the through hole is surrounded in the middle of the support frame by the connection flat plate portion, the support body portion, the X-ray source installation reference portion, the electrical installation portion and the cooling component installation portion.

* * * * *